US00RE36297E

United States Patent [19]

Heino et al.

[11] E Patent Number: Re. 36,297

[45] Reissued Date of Patent: Sep. 14, 1999

[54] METHOD AND APPARATUS FOR TREATING A FIBER SUSPENSION

[75] Inventors: Jukka Heino; Raimo Kohonen, both of Savonlinna; Erkki Savolainen, Haapakallio, all of Finland

[73] Assignee: A. Ahlstrom Corporation, Noormarkku, Finland

[21] Appl. No.: 08/251,963

[22] PCT Filed: Jun. 26, 1990

[86] PCT No.: PCT/FI90/00169

§ 371 Date: May 1, 1991

§ 102(e) Date: May 1, 1991

[87] PCT Pub. No.: WO91/00768

PCT Pub. Date: Jan. 24, 1991

Related U.S. Patent Documents

Reissue of:

[64] Patent No.: 5,264,138
Issued: Nov. 23, 1993
Appl. No.: 07/663,877
Filed: May 1, 1991

[30] Foreign Application Priority Data

Jul. 6, 1989 [FI] Finland ..... 893287

[51] Int. Cl.[6] ..... B01D 33/06; B01D 33/067; B01D 33/50; B01D 33/54

[52] U.S. Cl. ..... 210/784; 210/392; 210/393; 210/396; 210/402; 210/404; 210/406; 210/407; 210/408; 210/411; 210/412; 210/416.1; 210/797; 210/798

[58] Field of Search ..... 210/784, 797, 210/798, 392, 393, 395, 396, 402, 404, 406, 407, 408, 416.1, 411, 412; 162/217, 281, 307, 319, 321, 323, 357, 364, 369

[56] References Cited

U.S. PATENT DOCUMENTS

| | | | |
|---|---|---|---|
| 2,070,074 | 2/1937 | Young | 210/201 |
| 2,887,787 | 5/1959 | Barkley | 210/396 |
| 3,363,774 | 1/1968 | Luthi | 210/404 |
| 3,530,992 | 9/1970 | Turner | 210/392 |
| 3,919,088 | 11/1975 | Doncer et al. | 210/408 |

(List continued on next page.)

FOREIGN PATENT DOCUMENTS

| | | |
|---|---|---|
| 1122540 | 4/1982 | Canada . |
| 70803 | 5/1980 | Finland . |
| 1133526 | 11/1968 | United Kingdom . |
| 1323326 | 7/1973 | United Kingdom . |
| 1335196 | 10/1973 | United Kingdom . |
| 2106003 | 4/1983 | United Kingdom . |

*Primary Examiner*—John Kim
*Attorney, Agent, or Firm*—Nixon & Vanderhye P.C.

[57] ABSTRACT

A method and apparatus for fibrous suspensions in the wood processing industry and more specifically to a so-called drum cylinder, the basic construction of which comprises a vessel, into which suspension being thickened is supplied and a wire-surface cylinder rotating in the vessel. The drum filter is characterized in that the closure member of the drum filter has a channel for leading gas from the filtrate tubes through the compartments of the distribution chamber to the outside of the closing member. The method is characterized in that the operation phase of the filter cylinder is divided into five separate stages. In the first stage, when the cylinder descends on to the vessel, air and the initial filtrate are discharged from the filtrate components and the formation of the pulp web on the wire surface begins. In the second stage, filtrate is discharged with vacuum and the formation of the pulp web continues. In the third stage, pulp web is dried by means of vacuum when said part of the web has risen with the cylinder from the vessel. In the fourth stage, a so-called removal stage, the pulp web is removed from the wire surface and discharged from the apparatus. In the fifth stage, a so-called washing stage, the wire surface is washed.

21 Claims, 3 Drawing Sheets

U.S. PATENT DOCUMENTS

| | | | |
|---|---|---|---|
| 4,115,271 | 9/1978 | Holt | 210/402 |
| 4,147,634 | 4/1979 | Wegner | 210/396 |
| 4,255,264 | 3/1981 | Madsen | 210/404 |
| 4,608,171 | 8/1986 | LaValley | 210/404 |
| 4,618,424 | 10/1986 | Lundin | 210/396 |
| 4,789,433 | 12/1988 | Fuchs | 162/352 |
| 5,021,159 | 6/1991 | Bliss et al. | 210/407 |
| 5,158,691 | 10/1992 | McEwen et al. | 210/791 |

METHOD AND APPARATUS FOR TREATING A FIBER SUSPENSION

Matter enclosed in heavy brackets [ ] appears in the original patent but forms no part of this reissue specification; matter printed in italics indicates the additions made by reissue.

The present invention relates to a method and apparatus for treating pulp, which method and apparatus are especially suitable for treating fiber suspensions in the wood processing industry. The method and apparatus are particularly designed for thickening said suspensions, in other words, in filtering liquids from fiber suspensions in the pulp and paper industry.

The invention relates more specifically to a so-called drum cylinder, the basic construction of which comprises a vessel, into which suspension being thickened is supplied and a wire-surfaced cylinder rotating in the vessel. The ends of the cylinder have been sealed so as to prevent the cylinder from being filled with suspension. The cylinder has under its wire surface filtrate compartments, into which liquid from the suspension in the vessel passes due to the hydrostatic pressure thereon, whereby the fibers in the suspension are transferred with the liquid to the wire surface and are thickened forming a fiber matting thereon. The cylinder in this kind of filter based on hydrostatic pressure can be submerged in the suspension in the vessel only slightly below its axial level. When the cylinder rotates slowly, approximately 1 to 3 rpm, a fiber matting is slowly generated on the wire surface. The formation speed of the matting naturally depends not only on the thickness of the generated matting, but also on how deep in the vessel the filtration takes place. The filtration reaches its maximum speed slightly before the bottom dead centre, because the hydrostatic pressure is then close to its maximum and a thick matting does not yet disturb the filtration. After the bottom dead centre the formation of the matting slows down, until the formation, of course, ceases completely, when the matting rises from the suspension.

As the fiber matting descends into the vessel when the cylinder rotates the filtration begins, in other words, the discharge of air and initial filtrate from the filtrate compartments without vacuum begins. The fiber matting is removed from the cylinder at a stage, when it has passed the top dead centre and approaches the surface of the suspension. The matting may be removed either mechanically with wipers or by injecting either liquid or compressed air through the wire surface. The liquid which has flowed into the filtrate compartments may be discharged from the apparatus, for example, via the shaft of the apparatus or by utilizing some other arrangement. The length of a filtration period based on hydrostatic pressure in an apparatus according to the above description is approximately 140° of a rotation of a cylinder and the proportion of the initial filtration is approximately 30°.

The above described basic type of a drum filter has been considerably improved over the past decades. One significant improvement worth mentioning is subjecting the suspension in the vessel to suction applied through the compartments, whereby the filtration of liquid improves considerably and thus the capacity of the apparatus increases significantly. Most usually the suction is carried out by a suction leg in such a way that each of the filtrate compartments is connected by means of a separate filtration tube to a valve connected to the suction leg in the shaft of the apparatus, the operation of which valve is controlled in such a way that the fiber matting is subjected to suction in a sector of approximately 240°. Approximately 30 filtrate compartments have been arranged on the cylinder, each of which compartments has been connected with a separate filtrate tube to the shaft tube of the cylinder surrounding the valve. Since the fiber matting generated this way is significantly more tightly attached to the filtrate surface than the matting generated in a conventional way, the thickened fiber matting must be removed by separate apparatuses from the filtrate surface. At this point it must be noted that the suction leg may be replaced by some other apparatus creating vacuum, such as a vacuum pump.

One alternative method for removing the fiber matting is that liquid or an air spray of opposite direction is supplied through the filtrate tubes into a filtrate compartment and via such way to the wire surface, whereby said spray blows the fiber matting off the surface and at the same time flushes the openings of the wire surface clear. In this arrangement the medium flow gained by a blower is led through said valve apparatus into filtrate compartments. Another alternative method is to arrange the blowing according to Finnish Patent 70803 (public May 7, 1980, corresponding Canadian Patent 1122540) via a nozzle directly from a source of compressed air under the mechanical wiper, whereby the actual removal process of fiber matting is carried out by the compressed air blown from the nozzles and the wiper only leads the removed fiber matting towards a desired direction away from the cylinder.

One of the problems with the prior art apparatuses is that the filtrate tubes leading to the discharge of the filtrate from the filtrate compartments are filled with air at least when the fiber matting is removed from the wire surface. This, on the other hand, has the disadvantage that if suction is connected by said valve to the filtrate compartment through a filtrate tube immediately after said compartment has submerged into the suspension, air is subjected to the suction and it thus mixes with the filtrate. The air in the suction leg causes, for example, significant fluctuation in pressure and foaming of the filtrate.

It has been possible to partially eliminate this disadvantage in some of the prior art apparatuses by arranging a zone in said valve, through which the air filling the filtrate tube can be discharged through compartments still above the surface of the suspension and out of the apparatus. In other words, part of the filtrate tubes in the suspension are connected by means of a valve to the tubes above the suspension surface, whereby merely the liquid being filtered due to the hydrostatic pressure gradually fills the filtrate tube and pushes the air ahead of it away from the tube in question.

However, the apparatuses in accordance with the prior art are characterized in that filtrate tubes are used not only for the suction of the filtrate, but also for blowing air for removing the pulp web through a filtrate compartment under the pulp web. At the same time the pressure of the removal air affects also the filtrate tubes submerged under the liquid surface considerably decelarating the filtration taking place due to the hydrostatic pressure and that way filling the tube with liquid and displacing air from said tube. Since it is not possible to remove all air in the filtrate tube in a reasonable time, the suction of a vacuum source must be connected to the filtrate tube when it still contains air. Thus air flows to the vacuum source, mostly a suction leg, where it causes fluctuation in pressure, which on the other hand decreases the suction efficiency of the filter.

It has been possible to solve or minimize tine problems of the prior art apparatuses with the present invention in such a way that by applying the method and apparatus in accordance with the present invention it is possible to remove all air in the filtrate tube before connecting the suction.

The apparatus in accordance with the present invention is characterized in that the closing members of the filter cylinder have a channel for leading gas from the filtrate tubes through the compartments of the distribution chamber to the outside of the closing member. The method in accordance with the present invention is characterized in that the operation period of the filtration cylinder is divided into five stages separated from each other,

- in the first stage, when the cylinder descends into the vessel, air and the initial filtrate are discharged from the filtrate compartments and the formation of the pulp web on the wire surface begins;
- in the second stage filtrate is discharged with vacuum and the formation of the pulp web continues;
- in the third stage pulp web is dried by means of vacuum when said part of the web has risen with the cylinder from the vessel;
- in the fourth stage, a so called removal stage, pulp web is removed from the wire surface and discharged from the apparatus; and
- in the fifth stage, a so called washing stage, the wire surface is washed.

The method and apparatus in accordance with the present invention are described more in detail, by way of example, below with reference to the accompanying drawings, in which.

DETAILED DESCRIPTION OF THE PRESENTLY PREFERRED EMBODIMENTS

Figure 1:
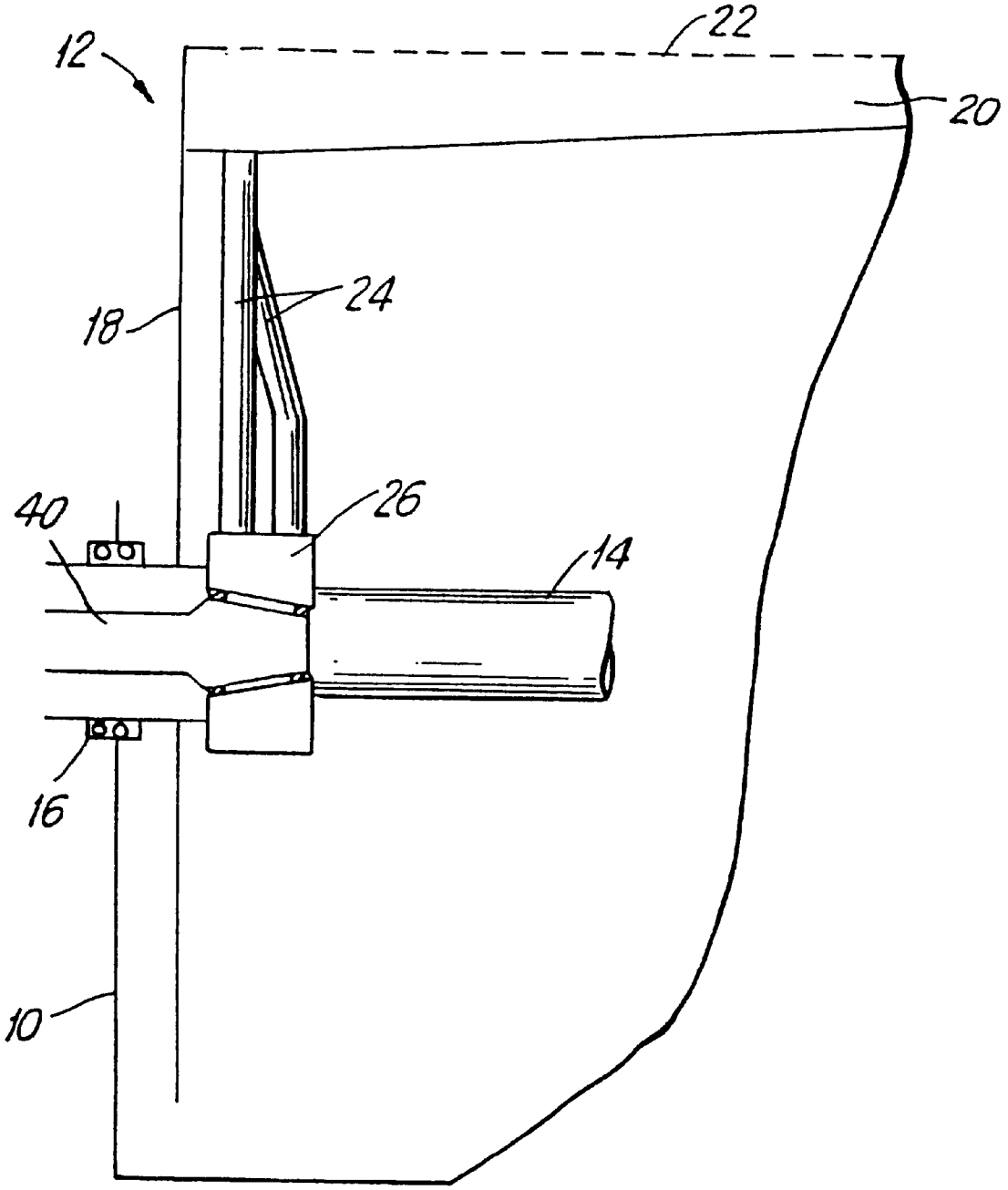
FIG. 1 is an axial sectional view of a filtration cylinder, with which the method and apparatus are designed to be used.

According to FIG. 1 a filter apparatus mainly comprises a vessel 10, which may be either completely open at the top or covered with a hood, and a cylindrical filter cylinder 12, which on shaft 14, which is mounted at the ends by means of bearings and seals 16 relative to the vessel 10. The body of the filter cylinder 12 comprises end plates 18 attached to the extension of the shaft 14, which plates at the same time prevent the axial admittance of the suspension to the inside of the cylinder, and filter compartments 20, by means of which the ends of the cylinder are connected to each other and which form the primary structure of the cylinder. The cover of a filter compartment may be either a perforated plate, on which the wire surface operating as a filter surface is located, or the wire surface 22 itself. If the cover of the filtrate compartment is a perforated plate, it can contribute to the operation as a member bearing the stresses of the cylinder. A great number of filtrate compartments 20, approximately 30–40, has been arranged about the rim of the cylinder. The bottoms of the filtrate compartments 20 are inclined either only towards one end of the cylinder or from the center towards the ends in both directions mainly dependant on the total length of the cylinder, which in most of the cases is more than 5 meters. Filtrate tubes 24 leading towards the shaft 14 of the cylinder have been connected to the bottom of the filtrate compartments 20 at the end of the cylinder (or at both ends, when the compartments have been inclined towards both ends). The extension of the shaft 14 adjacent to the filtrate tubes 24 is a distribution chamber 26, to which the filtrate tubes 24 are connected in either one or two rows mainly according to the diameter of the distribution chamber 26. The distribution chamber 26 is mainly required so that the filtrate flow for the filtrate tubes may be led to the suction leg without a need to constrict the sectional surface area of the flow. In the distribution chamber the sectional surface area of the flow is changed from the shape defined by a round filtrate tube to a rectangular defined by the radial intermediate and end walls of the chamber. A valve apparatus 40 guiding the filtrates of tubes 24 in a desired manner is located inside the distribution chamber 26. By means of said valve 40 it is possible, what the operation method of a conventional filter is concerned, to also lead the removal liquid or gas for the removal of the fiber matting by means of filtrate tubes 24 to filtrate compartments 20.

Figure 2:
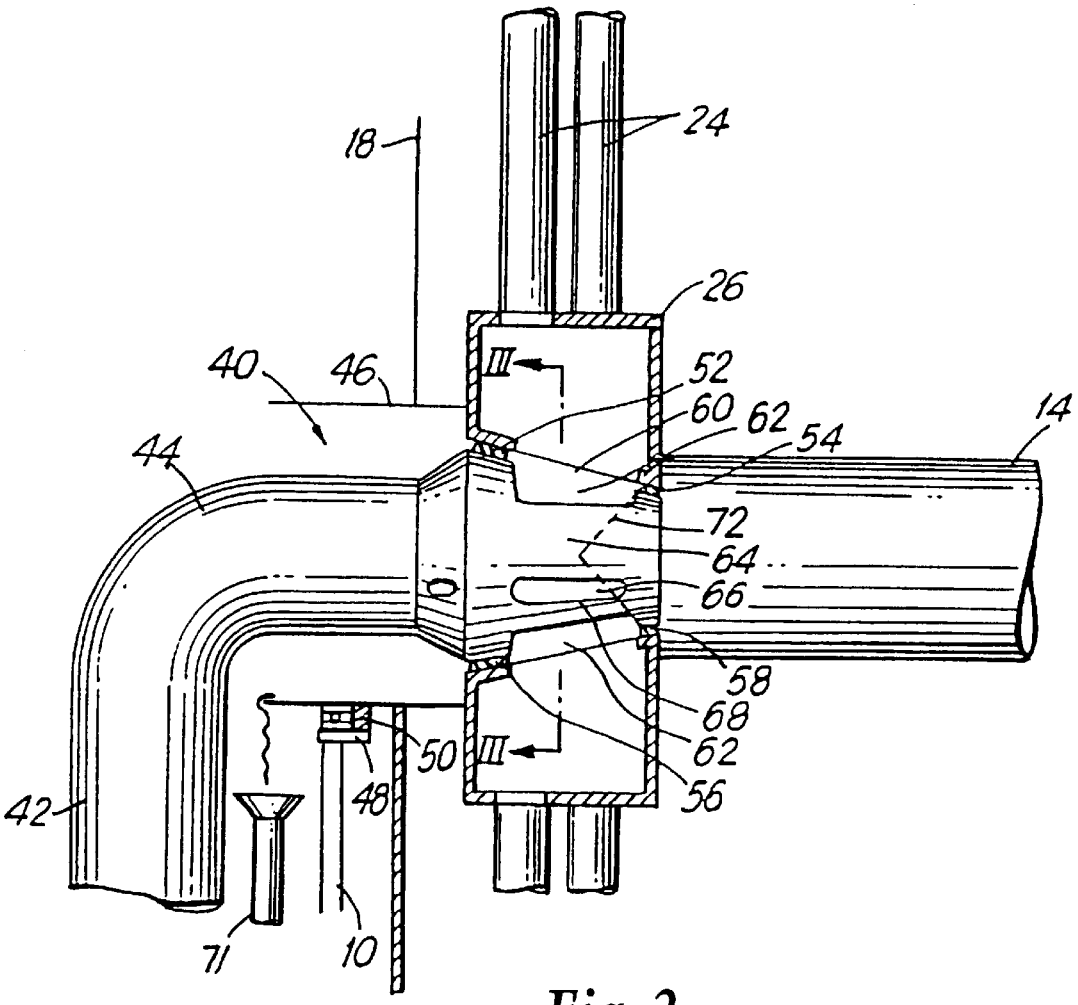
FIG. 2 is a more detailed illustration of the end of the filtration cylinder in accordance with FIG. 1, to which end the apparatus in accordance with the present invention is connected.

FIG. 2 illustrates a valve apparatus 40 of a drum filter in accordance with the present invention, which apparatus 40 contains a part 44 to be attached to a suction leg 42, the part 44 being located inside a cylinder 46 operating as an extension of the shaft of the cylinder 12 outside the distribution chamber 26. The cylinder 46 is mounted with bearings on bearing blocks 48 and sealed with seals 50 relative to the vessel. Advantageously two concentric conical surfaces 52 and 54 are located in the cylinder end of the valve apparatus 40 at a certain axial distance from each other. It is possible to arrange, when required, between said conical surfaces 52 and 54 and the distribution chamber 26 surrounding the valve apparatus, which chamber 26 in this zone of the valve apparatus is conical corresponding the form of the end of the valve apparatus, sealing members 56 and 58 which due to their frictional properties enable the rotation of the distribution chamber without friction relative to the valve apparatus 40. In some cases it is possible to operate without said sealing members by arranging the clearance of the conical surfaces narrow enough so that the liquid flowing to the closure member 40 from the distribution chamber seals said clearance. Oblong openings 60 have been arranged at the conical radially inner surface of the distribution chamber 26 of the sealing members 56 and 58, the number of which openings is advantageously the same as the number of the filtrate tubes, and which are connected inside the distribution chamber to the filtrate tubes 24 attached to the radially outer surface of the distribution chamber 26 via V-shaped spaces formed by the substantially radial intermediate walls of the distribution chamber. A construction arrangement enabling a new and inventive operation of a valve apparatus is located between conical surfaces 52 and 54 of the valve apparatus 40. The major portion 62, of the space between said conical surfaces 52 and 54 is open to allow the filtrate to flow toward the inside of the closure member 40 and via part 44 to the suction leg 42. Part or segment 64 of the space between said conical surfaces 52 and 54 is, however said or closed so that there is no connection between the filtrate tubes 24 and the suction leg. This is achieved either by arranging member corresponding sealing members 56 and 58 at the part 64, which member slides along the conical inner surface of the distribution chamber 26 or by arranging the clearance of said conical surfaces narrow enough to prevent the leakages between the V-shaped chambers of the distribution chamber or the leakage between the suction leg 42 and the distribution chamber 26. The closure member 40 also has an area 66, which is separated from the inner part of the closing member by an intermediate wall and sideways by a ridge 68 from the open part 62, shown in FIG. 3. Area 66 is recessed inwards from the level of the conical surface 64 so that channel 70 leads from the part 66 to the outside of the part 44 and between the valve apparatus 40 and the shaft tube 46. The purpose of said channel 70 is to guide the air accumulated in the filtrate tubes away thereby preventing the air from flowing to the suction leg 42 through the inner space of the valve apparatus. The gas being discharged out of the channel 70 and containing some of the filtrate is further led along a separate tube 71, for example, into a filtrate chamber. When required, it is possible to arrange inside the closure member 40 a guide cone 72 or like shown in FIG. 2, by means of which the flow coming from the filtrate tubes 24 through the distribution chamber is smoothly and axially directed.

Figure 3:
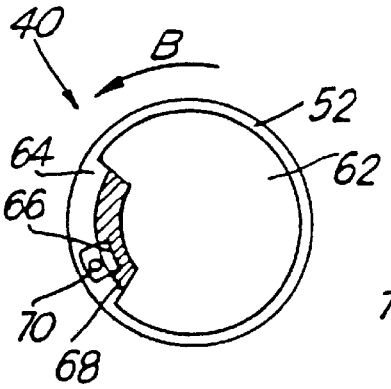
FIG. 3 is a sectional view of apparatus in accordance with the present invention along line III—III in FIG. 2.

FIG. 3 shows how the closing member 40 is open, at 62, for most of the area of its end. Reference number 52 refers to the conical seal surface which is the largest part of the closing member with respect to the diameter. Arrow B illustrates the rotational direction of the filter cylinder and the distribution chamber moving with it relative to the closure member 40. The inner part of the closing member 40 following the open part 62 in the rotational direction is closed relative to the distribution chamber by means of the segment or surface 64, which surface extends either via a sealing member or in itself into close proximity of the inner surface of the distribution chamber. Area 66 follows the surface 64 in the rotational direction of the distribution chamber, which area 66 is recessed relative to the surface 64 and dimensioned in the rim direction so that some of the openings of the inner surface of the distribution chamber are adjacent to the area 66 at the same time. Area 66 is separated at its latter edge or downstream edge when viewed in the rotational direction from the open part 62 by a ridge 68, the dimension of which, parallel to the rim, covers at its minimum the width of the openings of two distribution chambers and the intermediate wall therebetween. An advantageously axial channel 70 leads from area 66 to the outside of part 44 of the closure member 40. Area 66 has been separated by an intermediate wall, the inner dimension of which is substantially equal to the inner dimension of the surface 64, from the inner space of the closure member 40. If required, it is also possible to arrange ribs or the like at the area 62, if it is assumed that the conical surface 54 should be supported in the sector of the open area 62 in the rim of the closing member. In such a case it must be ensured that said rib does not substantially disturb the flow from the filtrate tubes via the distribution chamber and the closing member to the suction leg.

Figure 4A:
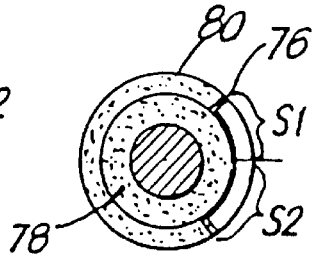
PRIOR ART Fig. 4A
FIGS. 4A and 4B are schematic illustrations of the operational principles of a closing member in accordance with the prior art and the present invention.
Figure 4B:
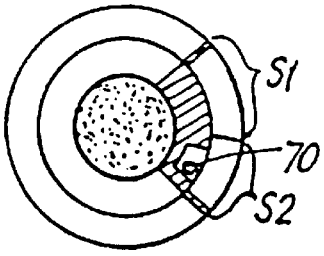

FIG. 4A illustrates the principle of operation of a filter in the prior art technique and FIG. 4B the principle of operation of a closing member in accordance with the present invention. FIG. 4A teaches how a closure member 76 closes the connection between the filtrate tubes and the discharge chamber thereby preventing the discharge 78 of the filtrate both from the filtrate compartments during the removal stage of the pulp web (area S1) and from filtrate compartments during the discharge stage (area S2). The closure member 76 is by a uniform sector, which is open towards the distribution chamber 80 in such a way that the removal of the pulp web may be carried out by blowing removal air through filtrate tubes to the filtrate channels. In such a case the pressure of the removal air affects also the filtrate tubes in the discharge stage tending to press the filtrate filtered in them due to gravitation towards the wire surface. This means in practice a significant factor decelarating the gravitational filtration. Due to both the natural slowliness of the gravitational filtration and the pressure of the removal air there is not sufficient time to withdraw the air from the filtrate tubes before the compartment of the distribution chamber adjacent to the tube in question passes by the second valve edge, which causes the suction to be to the filtration tube in question. Thereby, the air is drawn from the filtration tube in to the suction leg, where it causes fluctuation in pressure and weakens the suction result in the entire filter.

FIG. 4B illustrates the principle of operation of the arrangement in accordance with our invention, which principle is firstly characterized in that the filtrate tubes in the discharge stage S2 are separated from the filtrate tubes in the removal stage S1. Thus the pressure of the removal air does not disturb the filling of the filtrate tubes with the filtrate based on gravitation, thus allowing sufficient time for the air to be removed from the tubes before the suction is applied. The discharge of air is also facilitated by a channel 70 arranged in the closure member, by which channel the air, and possibly also together with some filtrate is discharged from the apparatus via its own route. It is possible by utilizing the described arrangement further to use the old pulp web removal system, in which the removal air is blown through filtrate tubes into the filtrate compartments under the pulp web. The filtrate tubes in the removal stage S1 have, however, been advantageously separated from each other (shown in FIG. 4B) in such a way that neither the flow of air nor the flow of the liquid from one filtrate tube to another is possible during the removal stage.

Figure 5:
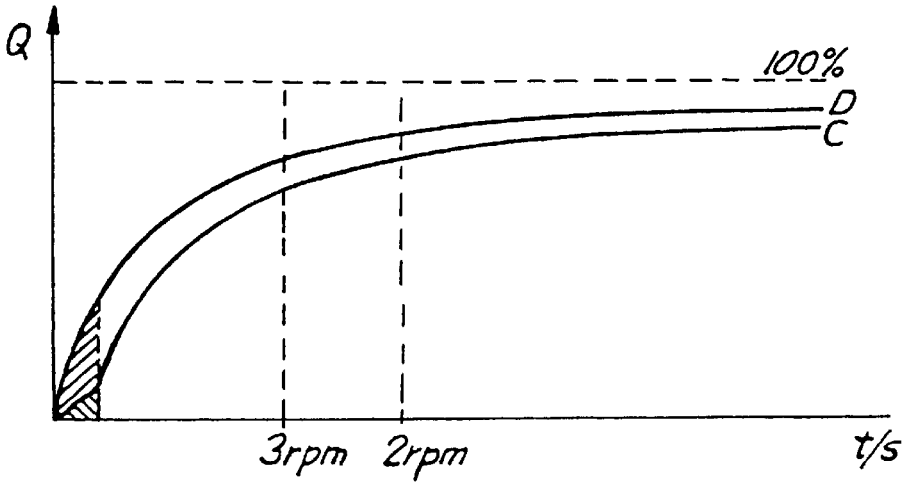
FIG. 5 is a graphic illustration of the amount of the filtrate separated when applying the method in accordance with the present invention compared with an apparatus applying a method in accordance with the prior art technique.

FIG. 5 illustrates the amount of the filtrate gained when applying the method in accordance with the present invention compared with the apparatuses of the prior art technique. The vertical axis in FIG. 5 illustrates the gained filtrate amount and the horizontal axis time in seconds used for the filtration. The dashed line parallel to the horizontal axis refers to the maximal amount of filtrate gained from the suspension in question, which both of the curves C and D approach. The curve C refers to the amount of filtrate gained by a drum filter in accordance with the prior art and the curve D the amount of liquid filtered by the apparatus in accordance with the present invention. It may be appreciated from the figure that the curve C begins with a flat part, in other words the filtration starts slowly, which is due to the fact that the air in the filtrate tubes must be partially discharged through the suction leg, because there has been no other alternative. The amount of air in the filtrate tubes increases also, because the air used in the removal of the pulp web is often blown through the filtrate tubes into the filtrate compartments, whereby the pressure of said blow air also affects in a decelarating way the initial filtration, which is carried out by gravitation, thus leaving more air in the filtrate tubes than if the tubes would be allowed to empty as the effect of the filtration based on gravitation. When the suction is connected to the closure member, the filtrate tubes still contain air, which will expand when reaching the suction leg, and cause fluctuation in the suction and thus significantly weaken the filtration process.

Curve D starts with a steep rise immediately from the beginning, because the air in the filtrate tubes has been led through the closure member without allowing it to enter the suction leg. Consequently, the filtrate tubes in the removal stage of the pulp web are separated by closure member in accordance with the present invention from the filtrate tubes in the discharge stage and the pressure of the removal air of the pulp web in accordance with the prior art technique is not allowed to disturb the gravitational filtration.

The figure includes also vertical dashed lines, which illustrate the time available for the entire filtering process at the rotational speed 2 rpm and 3 rpm. It is appreciated from the figure that the curve C in accordance with the prior art technique is not at any point able to reach the curve representative of applying the method in accordance with the present invention at any point. There are not even theoretical possibilities for this, since the time available for the filtering is limited. The difference between the curves slightly decreases constantly, in other words the slope of the curve C is constantly slightly higher than that of the curve D, because, due to the more efficient filtering in the initial stage, the pulp web produced by the apparatus in accordance with the present invention is of a higher consistency and its filterability respectively lower.

The rotational speed of a filter cylinder can be utilized in the flow of the filtrate completely in the arrangement in accordance with the invention. It is known that the rim speed of the filter cylinder is approximately 2 m/s, whereby the filtrate flowing into the filtrate tube has a speed component parallel to the rim of the cylinder. When the speed parallel to the rim decreases an accelerating spiral of vortex flow is generated in the filtrate tube, for the guidance of which it is possible to arrange inside the closing member either a conical piece 72 shown with a dashed line in FIG. 2 or it is even possible to arrange advantageously designed guide blades inside the closing member to ensure that the generated spiral vortex is not dampened, but it is allowed to continue until the suction leg. It is known that the spiral flow in a vertical tube in considerably faster than an even flow. By utilizing the rotational speed of the cylinder to accelerate the spiral flow it is possible to intensify the suction effect of the suction leg considerably.

Figure 6:
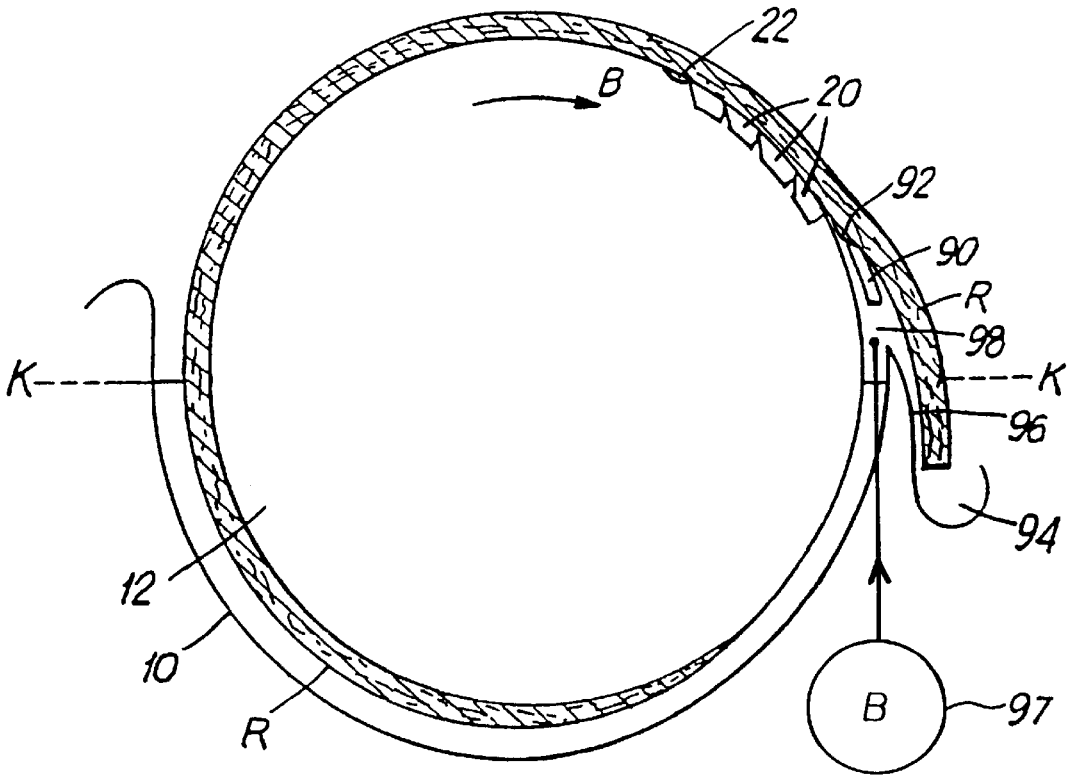
FIG. 6 is a schematic illustration of removal of pulp web on the filter cylinder in accordance with the pulp web and means utilized in the discharge.

FIG. 6 illustrates the removal means for the pulp web of a drum cylinder in accordance with the present invention. The figure schematically shows a vessel 10, in which a filter cylinder 12 provided with a wire surface 22 rotates. The vessel 10 is filled with fiber suspension up to a level K, which suspension forms a pulp web R on the wire surface 22 in the way shown in the figure. Removal and discharge means for the pulp web have been mounted subsequent to the top dead center of the cylinder 12 in the rotational direction B before the wire surface submerges into the suspension. These means comprise a wiper body 90, which is attached from the ends, for example, to the supporting structures of the end part of the vessel 10 or to the ends of the hood of the filter, a wiper 92 mounted to the body 90 and extending from the wire surface to the end of the clearance and a slope 96 leading to the discharge groove 94 arranged outside the vessel 10. The wiper 92 is produced either of a plastics material, steel or some other material suitable for this purpose.

The removal of the pulp web from the wire surface is carried out in such a way that air or some other appropriate medium flow is led from the blower [(not shown)] *97* into a space 98 defined by the wire surface 22, the surface of the suspension and the removed pulp web R. Said space 98 is sealed from the sides by edge seals (not shown) mounted in the ends of the filter in such a way that the pressure difference required for the removal of the pulp web R from the wire surface can be maintained. Said removal medium flows and leads the pressure not only directly from the gap between the wiper 92 and the wire surface 22 to the boundary surface between the wire surface and the pulp web but also under the pulp web via the filtrate compartment 20. Since the filtrate tubes in the removal stage are closed by the closing member from the inner end, the removal medium is not allowed to be discharged through the filtrate tubes, but the same pressure prevails in the filtrate compartment as in the space 98. One significant advantage is achieved with this arrangement, namely the self-cleaning effect of the wiper. If the wiper 92 is produced from somewhat flexible material, the wall between filtrate compartments 20 causes, when passing the tip of the wiper a slight pressure increase (*pulsation*) in the space 98, which again causes the bending of the wiper 92 outwards from the wire surface, whereby, for example, an accumulation of fibers generated between the tip of the wiper 92 and the wire surface 22 is allowed to loosen and fall into the suspension. At the same time when the wiper 92 rises it also draws the pulp web slightly off from the wire surface 22.

As is appreciated from the above description, a new kind of method and apparatus have been developed for treating pulp with a filter cylinder. Although the above description includes only a few embodiments of the method and apparatus in accordance with the present invention, all such different variations are possible, which remain within the scope of invention defined in the accompanying patent claims.

We claim:

1. An apparatus for removing filtrate from paper pulp comprising:

a wire-surfaced cylinder rotatable about an axis of rotation;

a plurality of filtrate compartments disposed beneath said wire surface;

a distribution chamber mounted within said cylinder for rotation about said axis of rotation;

a plurality of filtrate tubes extending between said filtrate compartments and said distribution chamber for passing gas and filtrate from said compartments to said chamber;

suction conduit for drawing the filtrate from said distribution chamber;

a stationary closure member disposed within said distribution chamber and being in fluid connection with said suction conduit, said closure member comprising a channel for permitting the gas and some filtrate to be discharged from said filtrate tubes to a location outside said closure member.

2. The apparatus of claim 1, wherein said channel is constructed so as to permit the gas and some filtrate to be discharged to a location outside said closure member and outside said suction conduit.

3. The apparatus of claim 1, additionally comprising a cone-shaped member within said closure member, said cone-shaped member being disposed at an end of the closure member and pointing toward said suction conduit for axially guiding the filtrate through the distribution chamber in a spiral flow.

4. The apparatus of claim 1, further comprising a vessel, said wire-surfaced cylinder being arranged within said vessel, said vessel being filled with paper pulp to a predetermined level, said channel of said closure member being located below said level.

5. A method of treating pulp including the formation of a pulp web on the surface of a wire-covered cylinder which rotates in a vessel containing pulp slurry and the removal of filtrate from the slurry through the wire surface by the application of a vacuum, the removal of pump from the wire surface and the discharge of the pulp therefrom, the discharge of the filtrate into filtrate compartments separated by a wall and the further discharge of the filtrate through filtrate tubes and through a closure member out to a suction apparatus, said method comprising the following separate stages:

in a first stage, when the cylinder descends into the slurry, removing air and some filtrate from a filtrate tube and forming the pulp web on the wire surface;

in a second stage, discharge filtrate by application of a vacuum and continuing the formation of the pulp web;

in a third stage, when the cylinder has emerged from the slurry, drying the pulp web by means of a vacuum;

in a fourth stage, removing the pulp web from the wire surface and discharging the removed pulp; and in a fifth stage, washing the wire surface.

6. The method of claim 5, whereby the pulp web is removed form the wire surface by passing a removal medium comprising substantially air into the filtrate tubes; and discharging the removal medium through the closure member separately from the filtrate.

7. The method of claim 5 wherein *removal of the pulp in the fourth stage is practiced by using a wiper having a tip, and wherein* there is a gap between the tip of the wiper and the wire surface; and comprising the additional step of cleaning the gap by forcing the tip of the wiper into a transverse movement away from the wire surface thereby widening the gap and removing pulp accumulated therebetween.

8. The method of claim 7, wherein the transverse movement is caused by arranging the gap between the tip of the wiper and the wire surface at a distance so that the movement of the wall between the filtrate compartments passed the tip of the wiper upon rotation of the cylinder causes an increase in pressure under the tip of the wiper.

*9. Apparatus for treating pulp comprising:*

*a vessel;*

*a wire-surfaced cylinder rotatable about a shaft, said shaft mounted and tightly sealed at the ends thereof to said vessel;*

*a source of pressure medium for removing and discharging a pulp web from said wire-surface cylinder;*

*a plurality of filtrate compartments located adjacent each other to form a shell of said wire-surface cylinder;*

*filtrate tubes located at at least a first end of said cylinder and each extending inwardly, to an inner end, of a compartment;*

*a suction source connected to said inner ends of said filtrate tubes; and*

*a flexible wiper disposed exteriorly of said wire-surface, and constructed, dimensioned, and positioned so as to flex radially toward and away from said wire-surface cylinder.*

*10. Apparatus as recited in claim 9 wherein said wiper is caused to flex radially in response to a pressure supplied by said pressure medium.*

*11. Apparatus as recited in claim 10 wherein said wiper has a tip; and wherein said wiper is mounted with a clearance between said tip thereof and said wire-surface of said cylinder, said clearance being changed in response to the pressure of said pressure medium.*

*12. Apparatus as recited in claim 9 wherein said wiper has a tip; and wherein said wiper is mounted with a clearance between said tip and said wire-surface of said cylinder, said clearance being changed in response to the pressure of said pressure medium.*

*13. Apparatus as recited in claim 9 wherein said wiper has a tip, and wherein said filtrate compartments include one or more walls therebetween; and wherein said wiper has sufficient flexibility, and is so mounted, that as said walls of said filtrate compartments rotate past said wiper tip a slight pressure increase causes said wiper tip to bend outwardly from said wire-surface of said cylinder, causing any accumulation of fibers between said wiper tip and said wire surface to loosen and fall into the pulp, and to cause the pulp web to be drawn slightly off of said wire surface of said cylinder.*

*14. Apparatus as recited in claim 10 wherein said wiper has a tip, and wherein said filtrate compartments include one or more walls therebetween; and wherein said wiper has sufficient flexibility, and is so mounted, that as said walls of said filtrate compartments rotate past said wiper tip a slight pressure increase causes said wiper tip to bend outwardly from said wire-surface of said cylinder, causing any accumulation of fibers between said wiper tip and said wire surface to loosen and fall into the pulp, and to cause the pulp web to be drawn slightly off of said wire surface of said cylinder.*

*15. A method of treating pulp utilizing a wire-surfaced filter cylinder disposed in a vessel surrounding the cylinder and rotatable about an axis, comprising the steps of:*

*(a) supplying pulp into the vessel surrounding the cylinder;*

*(b) rotating the cylinder in the vessel to form a pulp web on the wire surface of the cylinder;*

*(c) removing liquid through the pulp web in the wire surface of the cylinder to form filtrate, which is discharged from the vessel by being fed through filtrate tubes; and*

*(d) removing the pulp web from the wire surface of the cylinder by providing a flexible wiper having a clearance between a tip thereof and the wire surface of the cylinder by radial flexing of the tip of the flexible wiper with respect to the axis of rotation of the wire-surfaced cylinder.*

*16. A method as recited in claim 15 wherein step (d) is practiced by providing pressure pulsations from the interior of the wire surface of the cylinder, the pressure pulsations causing radial movement of the tip of the flexible wiper toward and away from the wire surface of the cylinder.*

*17. A method as recited in claim 16 wherein step (d) is further practiced so that any fiber accumulating in the clearance causes the fibers to loosen and be discharged into the pulp.*

*18. A method as recited in claim 16 wherein the wire-surfaced cylinder has a plurality of filtrate compartments located adjacent each other with a wall between each adjacent filter compartments, and wherein step (d) is practiced to provide pressure pulsations as each wall is rotated past the tip of the wiper.*

*19. A method as recited in claim 15 wherein the wire-surfaced cylinder has a plurality of filtrate compartments located adjacent each other with a wall between each adjacent filter compartments, and wherein step (d) is practiced to provide pressure pulsations as each wall is rotated past the tip of the wiper.*

*20. A method as recited in claim 17 wherein the wire-surfaced cylinder has a plurality of filtrate compartments*

*located adjacent each other with a wall between each filter compartment, and wherein step (d) is practiced to provide pressure pulsations as each wall is rotated past the tip of the wiper.*

21. A method as recited in claim 15 wherein step(*d*) *is further practiced so as to cause any fiber accumulating in the clearance to loosen and be discharged into the pulp.*

* * * * *